(12) United States Patent
Imae

(10) Patent No.: US 8,171,149 B2
(45) Date of Patent: May 1, 2012

(54) COMMUNICATION SYSTEM, TERMINAL DEVICE, AND METHOD OF CONTROLLING TERMINAL DEVICES IN COMMUNICATION SYSTEM

(75) Inventor: Nozomi Imae, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1269 days.

(21) Appl. No.: 11/812,105

(22) Filed: Jun. 15, 2007

(65) Prior Publication Data

US 2008/0007773 A1 Jan. 10, 2008

(30) Foreign Application Priority Data

Jun. 15, 2006 (JP) ................................. 2006-165608
Feb. 28, 2007 (JP) ................................. 2007-050671

(51) Int. Cl.
*G06F 15/16* (2006.01)
(52) U.S. Cl. .................... 709/229; 709/228; 370/401
(58) Field of Classification Search .................. 709/228, 709/229; 370/401
See application file for complete search history.

(56) References Cited

U.S. PATENT DOCUMENTS

| 7,664,081 | B2* | 2/2010 | Luoma et al. ................ 370/338 |
| 2005/0015467 | A1 | 1/2005 | Noda |
| 2005/0272371 | A1 | 12/2005 | Komatsuzaki et al. |
| 2008/0109331 | A1 | 5/2008 | Stadelmann et al. |

FOREIGN PATENT DOCUMENTS

| JP | 2001-189722 A | 7/2001 |
| JP | 2003-018282 | 1/2003 |
| JP | 2003-229872 A | 8/2003 |
| JP | 2003-271561 A | 9/2003 |
| JP | 2004-007351 A | 1/2004 |
| JP | 2004-080755 | 3/2004 |
| JP | 2004-328288 A | 11/2004 |
| WO | WO 2005/117342 | 12/2005 |

OTHER PUBLICATIONS

Office Action dated Oct. 25, 2011, corresponding to Japanese Application No. 2007-050671.
Office Action from the Japan Patent Office dated Jan. 24, 2012, corresponding to Japanese Patent Application No. 2007-050671.

* cited by examiner

*Primary Examiner* — Adnan Mirza
(74) *Attorney, Agent, or Firm* — Harness, Dickey & Pierce, P.L.C.

(57) ABSTRACT

In a communication system, a first terminal device and a second terminal device are connected via a wireless network and perform communications with each other. Each of the first and second terminal devices includes an interface unit which accesses a memory-card type recording medium detachably mounted to the interface unit. Information needed for one of the first and second terminal devices to communicate with the other terminal device is transferred between the first terminal device and the second terminal device using the recording medium.

18 Claims, 15 Drawing Sheets

COMMUNICATION SYSTEM, TERMINAL DEVICE, AND METHOD OF CONTROLLING TERMINAL DEVICES IN COMMUNICATION SYSTEM

BACKGROUND OF THE INVENTION

1. Field of the Invention

This invention relates to a communication system in which two terminal devices are connected via a wireless communication network and perform point-to-point communications, a terminal device for use in a communication system, and a method of controlling terminal devices in a communication system. The terminal device hereinafter is considered to include electronic equipment connected to a network, such as image processing devices, including a computer, a workstation, a copier (including a digital copier), a printer, a facsimile, and a digital multi-functional peripheral.

2. Description of the Related Art

In recent years, the construction of a communication system in which many terminal devices are connected to a network is progressing so that various data can be transferred between two terminal devices. And a variety of forms of the communication system are realized.

Especially, a wireless network system (e.g., wireless personal area network (PAN)) in which wireless connections (or links) between respective terminal devices are established by wireless communications is a very important communication system for building the ubiquitous network society. The wireless PAN is a wireless LAN system which supports the range of communication up to about 10 m. For example, Japanese Laid-Open Patent Application No. 2004-080755 discloses a method of controlling electronic devices on a wireless LAN (local area network).

The wireless communication method upon which the above-mentioned communication system is based is point-to-point communications in which data are transferred between two terminal devices. Various methods of association are adopted in order to associate the two terminal devices which perform point-to-point communications using a wireless USB network to which many terminal devices are connected.

SUMMARY OF THE INVENTION

According to one aspect of the invention, there is provided an improved communication system in which the above-described problems are eliminated.

According to one aspect of the invention there is provided a communication system having new mechanisms for associating two terminal devices which perform point-to-point communications using a wireless USB network.

In an embodiment of the invention which solves or reduces one or more of the above-mentioned problems, there is provided a communication system in which a first terminal device and a second terminal device are connected via a wireless communication network and perform point-to-point communications with each other, each of the first and second terminal devices comprising an interface unit accessing a memory-card type recording medium detachably mounted to the interface unit, wherein information needed for one of the first and second terminal devices to communicate with the other terminal device is transferred between the first terminal device and the second terminal device using the recording medium.

In an embodiment of the invention which solves or reduces one or more of the above-mentioned problems, there is provided a terminal device for use in a communication system in which at least two terminal devices are connected via a wireless communication network and perform point-to-point communications with each other, the terminal device comprising an interface unit accessing a memory-card type recording medium detachably mounted to the interface unit, wherein information needed for one of the terminal device and another terminal device to communicate with the other terminal device is transferred between the terminal device and said another terminal device using the recording medium.

In an embodiment of the invention which solves or reduces one or more of the above-mentioned problems, there is provided a method of controlling terminal devices in a communication system in which a first terminal device and a second terminal device are connected via a wireless communication network and perform point-to-point communications with each other, each of the first and second terminal devices comprising an interface unit accessing a memory-card type recording medium which is detachably mounted to the interface unit, the method comprising the steps of: causing the first terminal device to receive information needed for the first terminal device to communicate with the second terminal device, from the second terminal device using the recording medium; and causing the second terminal device to receive information needed for the second terminal device to communicate with the first terminal device, from the first terminal device using the recording medium.

According to the embodiment of the communication system of the invention, using a memory-card type recording medium, the information needed for one of two terminal devices to perform point-to-point communications with the other terminal device can be exchanged between the two terminal devices, enabling the communication system of the invention to perform reliable and secure communications.

BRIEF DESCRIPTION OF THE DRAWINGS

Other objects, features and advantages of the present invention will be apparent from the following detailed description when reading in conjunction with the accompanying drawings.

DETAILED DESCRIPTION OF PREFERRED EMBODIMENTS

A description will be given of an embodiment of the invention with reference to the accompanying drawings.

Figure 1:
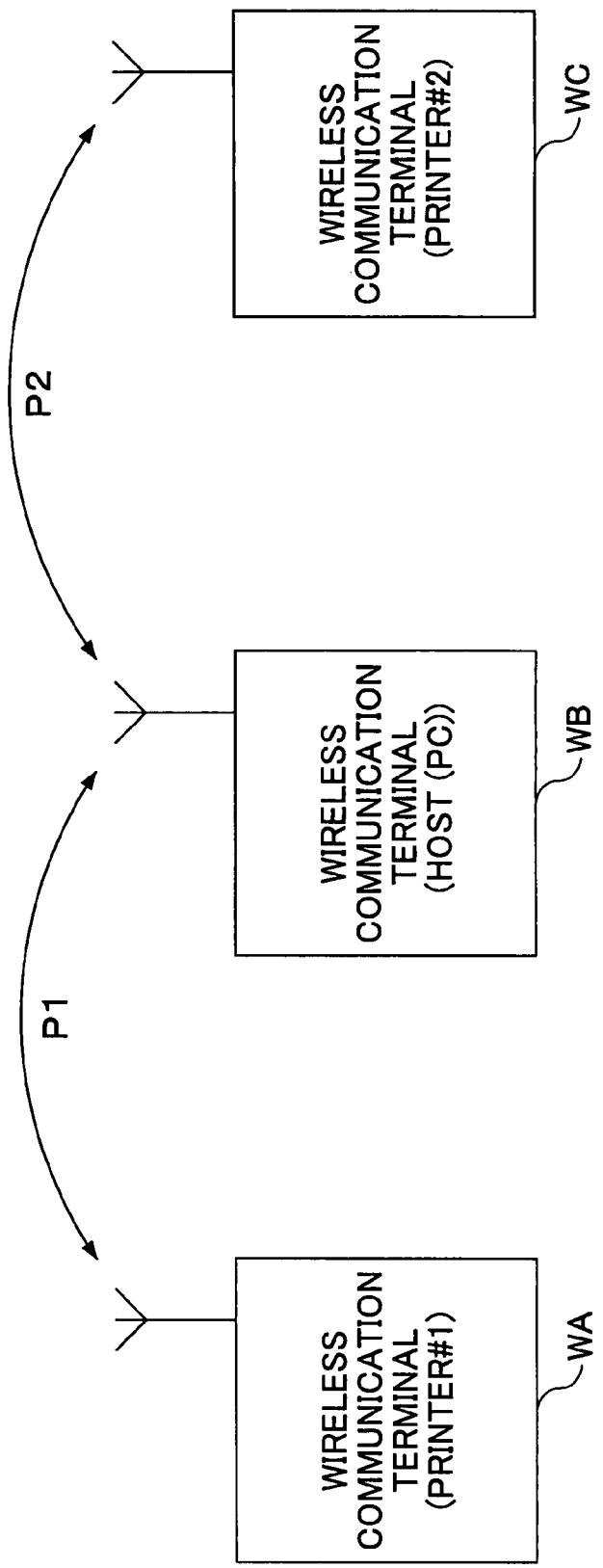
FIG. 1 is a block diagram showing a communication system in an embodiment of the invention.

FIG. 1 shows a communication system in an embodiment of this invention. In the communication system of FIG. 1, three wireless communication terminals WA, WB and WC perform point-to-point communications through a wireless PAN (personal area network) using the W-USB (wireless universal serial bus) communication protocol.

The wireless communication terminals WA and WC (printer#1 and printer#2) are provided with image processing functions, such as a printer function, and these terminals are equivalent to "device" in the W-USB communication. Examples of the wireless communication terminals WA and WC may include a copier (including a digital copier), a printer, a facsimile, a digital multi-function peripheral, etc.

The wireless communication terminal WB (host or personal computer) is provided with the host function (for example, a personal computer), and this terminal is equivalent to "connection host" in the W-USB communication. Examples of the wireless communication terminal WB may include a workstation etc.

In the case of the communication system of FIG. 1, a communication path P1 between the wireless communication terminal WA and the wireless communication terminal WB is established, and point-to-point communications are performed between the wireless communication terminal WA and the wireless communication terminal WB. For example, a print job created in the wireless communication terminal WB is transmitted to the wireless communication terminal WA via the communication path P1, and the wireless communication terminal WA performs printing of an image based on the received print job and outputs a printed image.

Moreover, in the case of the communication system of FIG. 1, a communication path P2 between the wireless communication terminal WC and the wireless communication terminal WB is established, and point-to-point communications are performed between the wireless communication terminal WC and the wireless communication terminal WB.

Figure 2:
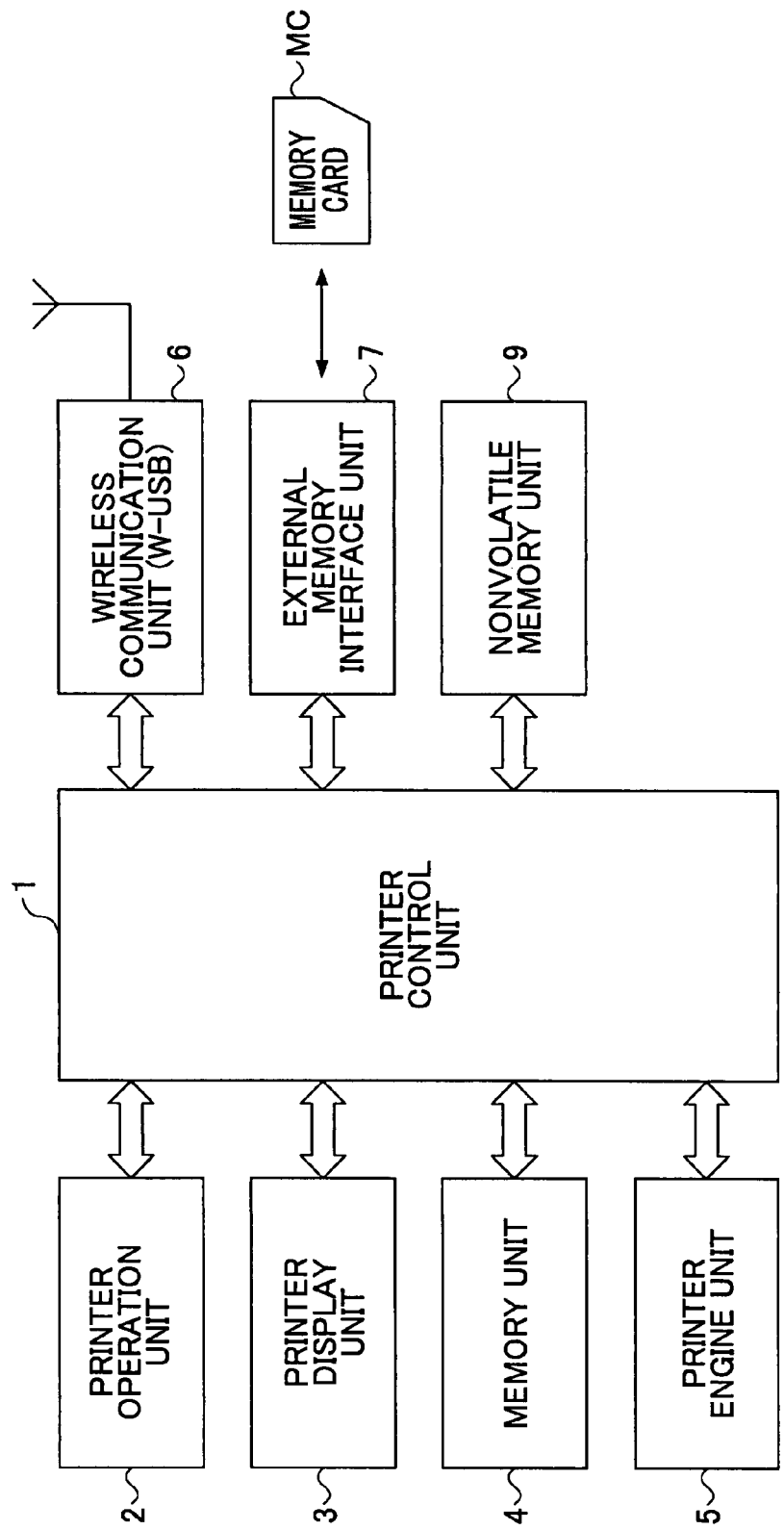
FIG. 2 is a block diagram showing the composition of each of wireless communication terminals WA and WC in FIG. 1.

FIG. 2 shows the composition of each of the wireless communication terminals WA and WC in FIG. 1. As shown in FIG. 2, the printer control unit 1 controls operation of the wireless communication terminal WA or WC.

The printer operation unit 2 is provided with a set of predetermined operation keys for performing operation of the wireless communication terminal WA or WC. The printer display unit 3 displays and outputs a message indicating a variety of status information items including a device status, etc. The memory unit 4 provides the work area of the printer control unit 1, the page memory for storing the print data, etc. The printer engine unit 5 performs printing of an image based on a print job and outputs a printed image.

The wireless communication unit 6 is provided to realize the function of performing point-to-point communications through the wireless PAN using the W-USB communication protocol. The external memory interface unit 7 is provided to perform mounting and demounting of a memory card MC as an exchangeable type recording medium, and access the memory card MC which is detachably mounted to the external memory interface unit 7. The nonvolatile memory unit 9 is provided to store various information items needed for performing the W-USB communication.

Figure 3:
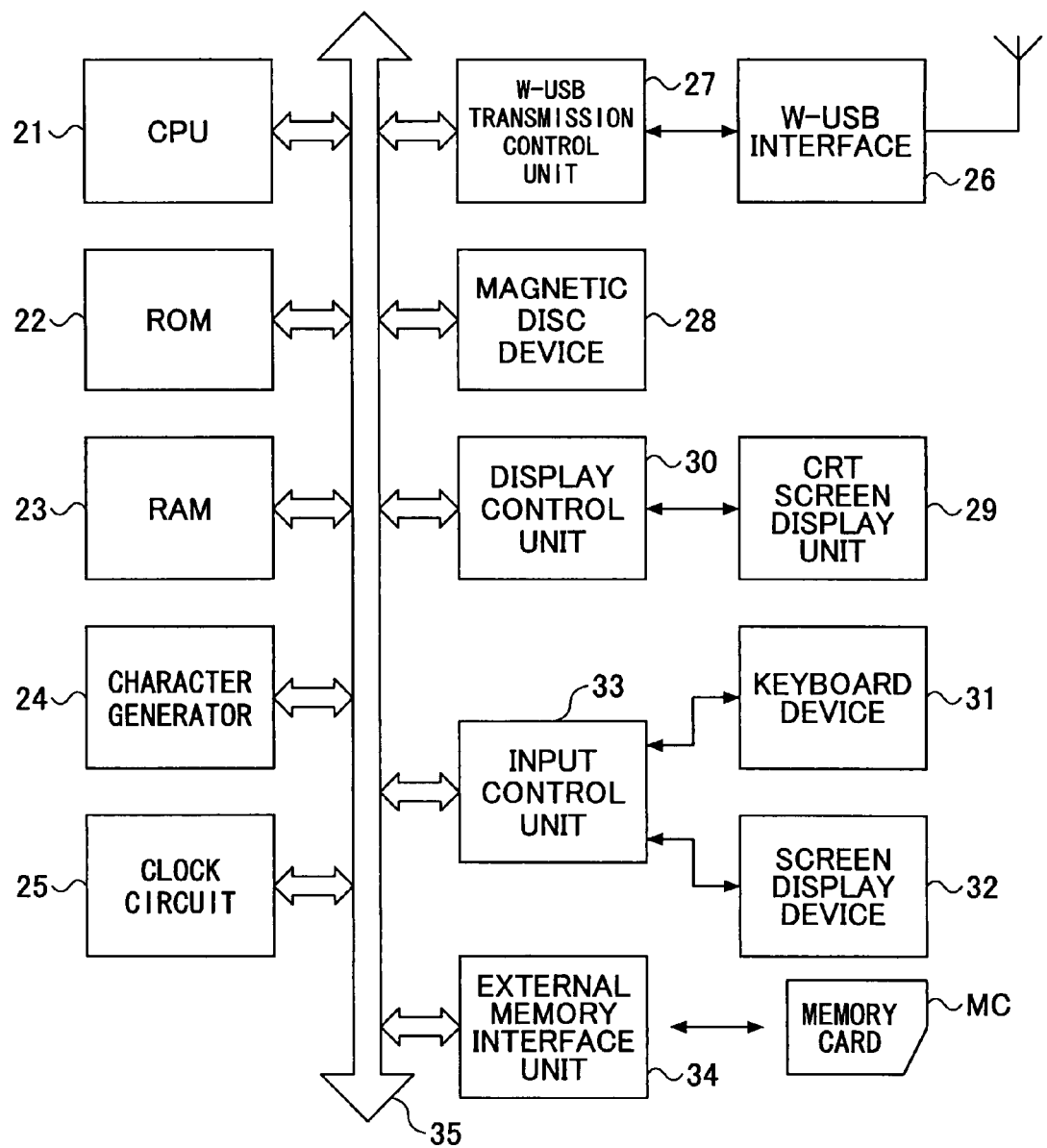
FIG. 3 is a block diagram showing the composition of a wireless communication terminal WB in FIG. 1.

FIG. 3 shows the composition of the wireless communication terminal WB in FIG. 1. As shown in FIG. 3, the CPU (central processing unit) 21 controls operation of the wireless communication terminal WB. The ROM (read only memory) 22 stores the program executed by the CPU 21 at the time of starting of the wireless communication terminal WB, as well as the necessary data, etc. The RAM (random access memory) 23 provides the work area of the CPU 21, etc.

The character generator 24 generates the display data of graphic characters. The clock circuit 25 outputs the current date and time information. The W-USB interface circuit 26 is provided to realize the function of performing the W-USB communication. The W-USB transmission control unit 27 performs communication control processing of the predetermined protocol suite for transmitting and receiving various data between the terminal device WB and another wireless communication terminal by using the W-USB communication.

The magnetic disc device 28 stores various application programs, such as a web browser, and various data including work data, file data, drawing information data, etc. The CRT screen display unit 29 displays the screen for operating the wireless communication terminal WB. The display control unit 30 controls the contents of the display screen of the CRT screen display unit 29.

The keyboard device 31 is provided to input various key strokes to the wireless communication terminal WB. The screen display device 32 is provided to perform operation of specifying the arbitrary point of the CRT screen display 29. The input control unit 33 is provided to capture the input information of the keyboard device 31 and the screen display device 32 into the wireless communication terminal.

The external memory interface unit 34 is provided to perform mounting and demounting of memory card MC as an exchangeable type recording medium, and access the memory card MC which is detachably mounted to the external memory interface unit 34.

The CPU 21, the ROM 22, the RAM 23, the character generator 24, the clock circuit 25, the W-USB transmission control unit 27, the magnetic disc device 28, the display control unit 30, the input control unit 33, and the external memory interface unit 34 are interconnected by the bus 35, and data transfer between the respective elements is mainly performed through the bus 35.

Figure 4:
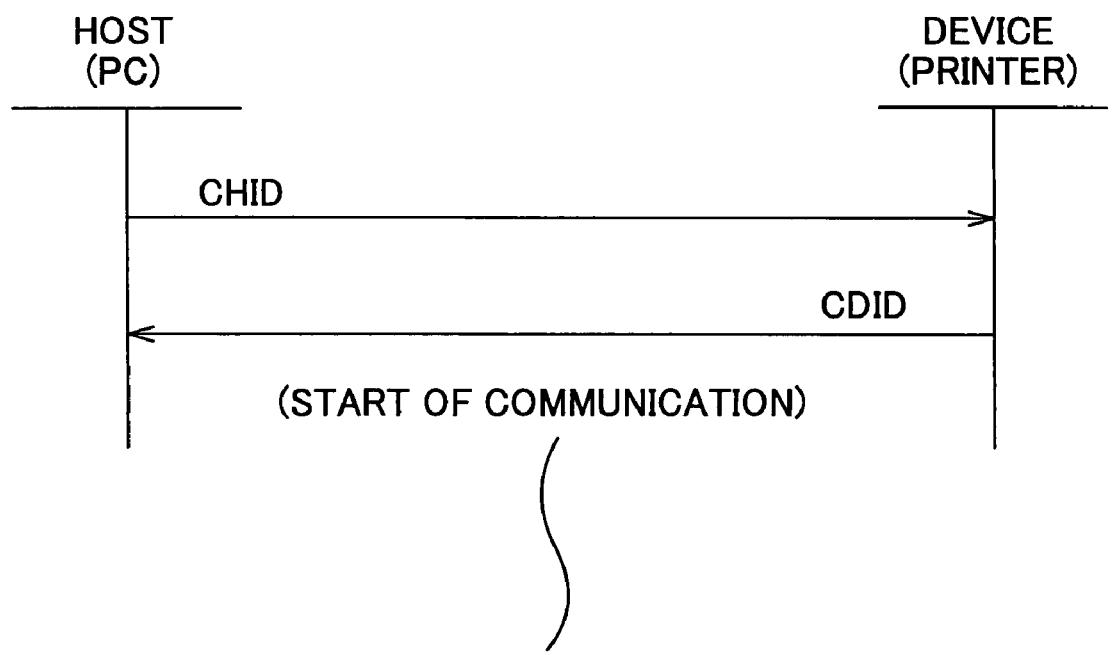
FIG. 4 is a timing diagram for explaining the exchanging of the information needed for performing point-to-point communications between a connection host and a connection device.

As shown in FIG. 4, when it is intended to perform point-to-point communications using the W-USB communication in this embodiment, the information needed for associating the respective terminal devices has to be transferred between a connection host and a connection device. Transferring of such information between the host and the device is equivalent to the phase of authentication prior to execution of point-to-point communications.

First, the host (wireless communication terminal WB) notifies information CHID (connection host ID) to the device (wireless communication terminal WA, WC), and the device stores this information CHID into the nonvolatile memory unit 9.

Subsequently, the device notifies information CDID (connection device ID) to the host, and the host stores this information CDID into the non-volatile memory (for example, the magnetic disc device 28).

In this manner, the information CHID and CDID is exchanged between the host and the device. Subsequently, the information CHID and CDID will be used as identification information of the terminal device of the communications partner, respectively, and it will be used as information for recognizing the terminal device of the communications partner in performing the point-to-point communications. Therefore, the point-to-point communications according to the W-USB communications protocol can be performed.

In this embodiment, transferring of the information CHID and CDID between the host and the device is carried out using memory card MC (memory-card type recording medium).

Specifically, the wireless communication terminal WB (host) writes the host ID (CHID), which is set up in the terminal device concerned, to the memory card MC. Subsequently, the user takes out the memory card MC to which the host ID is written from the external memory interface unit 34 of the wireless communication terminal WB, carries it to the wireless communication terminal WA, and mounts it to the external memory interface unit 7 of the wireless communication terminal WA.

In the wireless communication terminal WA, the host ID is read from memory card MC mounted to the external memory interface unit 7, and the same is stored into the nonvolatile memory unit 9.

Figure 5A:
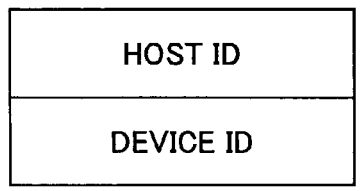
FIG. 5A, FIG. 5B, FIG. 5C, FIG. 5D and FIG. 5E are diagrams showing examples of the structure of the information stored in a memory card MC.

Subsequently, the wireless communication terminal WA writes the device ID (CDID), which is set up in the terminal device concerned, to the memory card MC. Therefore, as shown in FIG. 5A, the host ID and the device ID are written to the memory card MC.

Subsequently, the user takes out the memory card MC to which the device ID is additionally written, from the external memory interface unit 7 of the wireless communication terminal WA, carries it to the wireless communication terminal WB, and mounts it to the external memory interface unit 34 of the wireless communication terminal WB.

In the wireless communication terminal WB, the device ID is read from the memory card MC mounted to the external memory interface unit 34, and the same is stored into the magnetic disc device 28.

As mentioned above, transferring of the necessary information (the host ID and the device ID) is performed between the wireless communication terminal WA and the wireless communication terminal WB using the memory card MC.

In this embodiment, an example of the host ID may be a MAC (media access control) address which is used as a value specific to the terminal device concerned. An example of the device ID may be a MAC address, a manufacture serial number, etc. which are used as a value specific to the terminal device concerned.

Figure 6:
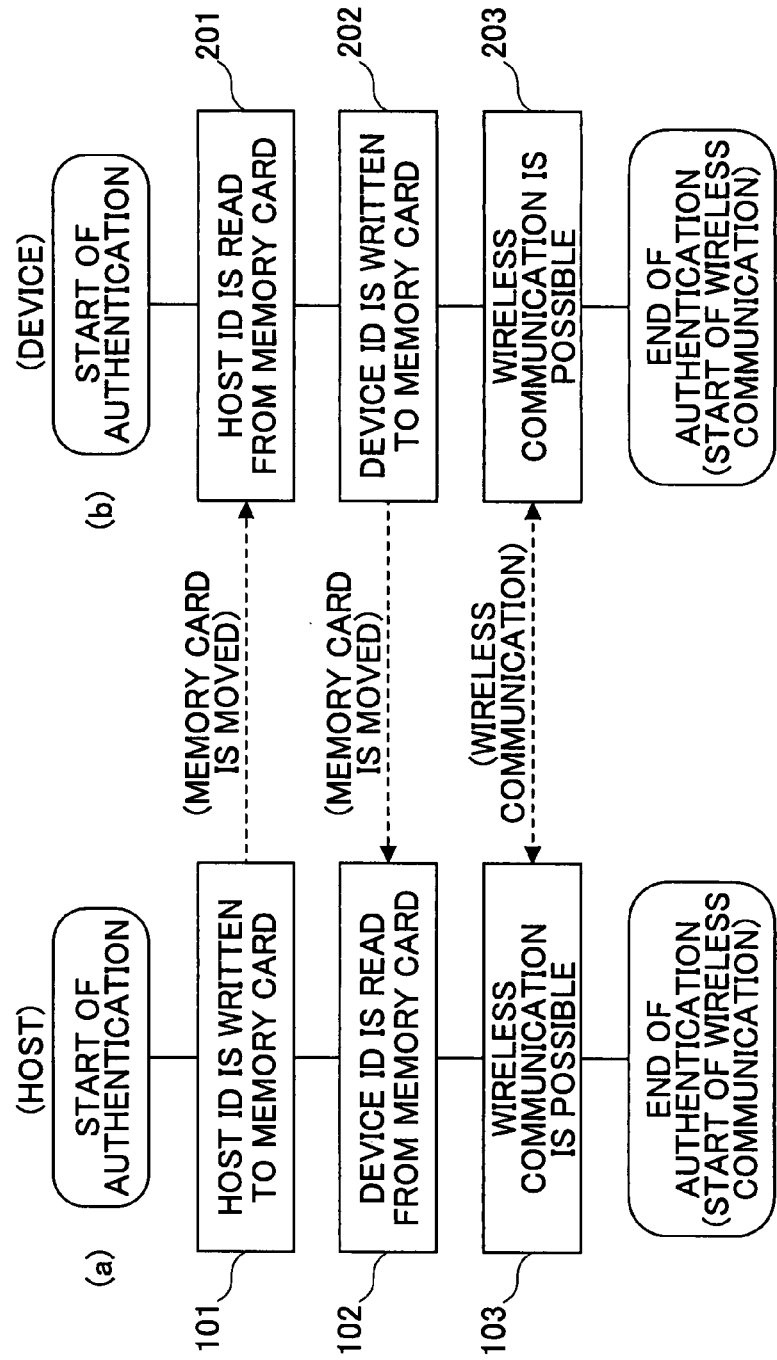
FIG. 6 is a flowchart for explaining an example of the processing performed by the host and the device.

FIGS. 6 (a) and (b) shows an example of the processing performed by the host (wireless communication terminal WB) and the device (wireless communication terminal WA, WC). The processing is equivalent to authentication operation for recognizing the communications partner for each terminal device in advance of execution of wireless communications.

First, in the wireless communication terminal WB (host), the user operates the keyboard device 31 so that the terminal device WB is shifted to the ID setting mode in which the ID setting is performed. Subsequently, the user mounts the memory card MC to the external memory interface unit 34. Alternatively, the memory card MC may be mounted beforehand to the external memory interface unit 34 before the terminal device WB is shifted to the ID setting mode.

The external memory interface unit 34 is provided with the function of detecting mounting (insertion) of a memory card MC to the wireless communication terminal WB and demounting (removal) of a memory card MC from the wireless communication terminal WB.

When mounting of the memory card MC is detected, the external memory interface unit 34 automatically writes the host ID (CHID), which is set up in the terminal device WB, to the memory card MC mounted thereto (step 101). Alternatively, after the mounting of the memory card MC is detected, the user may input the write command of host ID using the screen display device 32. Alternatively, when the memory card MC is mounted, the user may input the write command of host ID using the screen display device 32, without using the detection function.

Subsequently, the user takes out the memory card MC to which the host ID is written, from the external memory interface unit 34 of the wireless communication terminal WB, carries it to the wireless communication terminal WA (device), and mounts it to the external memory interface unit 7 of the wireless communication terminal WA.

When the memory card MC is taken out from external memory interface unit 34, the wireless communication terminal WB is set in a waiting state until a memory card MC is inserted again. In this waiting state, the wireless communication terminal WB may perform another processing operation (for example, printing operation, another processing operation by the screen display device 32, etc.).

Also in the wireless communication terminal WA, the user first operates the printer operation unit 2 so that the terminal device WA is shifted to the ID setting mode in which the ID setting is performed. Subsequently, the user mounts the memory card MC to the external memory interface unit 7. Alternatively, the memory card MC may be mounted beforehand to the external memory interface unit 7 before the terminal device WA is shifted to the ID setting mode.

The external memory interface unit 7 is provided with the function of detecting mounting (insertion) of a memory card MC to the wireless communication terminal WA, and demounting (removal) of a memory card MC from the wireless communication terminal WA.

When the mounting of the memory card MC is detected, the external memory interface unit 7 automatically reads the host ID from the memory card MC mounted thereto, and stores the read host ID into the nonvolatile memory unit 9 (step 201).

Alternatively, after the mounting of the memory card MC is detected, the user may input the read command of host ID using the printer operation unit 2. Alternatively, when the memory card MC is mounted, the user may input the read command of host ID using the printer operation unit 2, without using the detecting function.

Subsequently, the external memory interface unit 7 of the wireless communication terminal WA writes the device ID (CDID), which is set up in the terminal device WA, to the memory card MC mounted thereto (step 202).

Alternatively, the user may input the write command of device ID using the printer operation unit 2. Alternatively, when the memory card MC is mounted, the user may input the write command of device ID using the printer operation unit 2, without using the detecting function. Alternatively, the sequence of the reading operation and writing operation of host ID may be reversed.

Subsequently, the user takes out the memory card MC to which the device ID is written, from the external memory interface unit 7 of the wireless communication terminal WA, carries it to the wireless communication terminal WB, and mounts it to the external memory interface unit 34 of the wireless communication terminal WB.

After the above-mentioned setup is done, the wireless communication terminal WA (device) is set in a ready state that in which execution of wireless communications can be started, if preparation of the initial setting of the wireless communication unit 6 is completed (step 203). Alternatively, the wireless communication terminal WA (device) may be set in the ready state after the memory card MC is taken out from the external memory interface unit 7. The required setup may be performed after the power supply of the wireless communication terminal WA is turned ON. In such a case, as soon as the wireless communication terminal WB (host) is in the ready state, wireless communications can be started if acquisition of the host ID is completed.

On the other hand, when the mounting of the memory card MC is detected in the wireless communication terminal WB, the external memory interface unit 34 reads the device ID from the memory card MC automatically, and stores the read device ID into the magnetic disc device 28 (step 102). Alternatively, after the mounting of the memory card MC is detected, the user may input the read command of device ID using the screen display device 32.

In this manner, in the wireless communication terminal WA, the host ID of the wireless communication terminal WB of the communications partner is stored, and in the wireless communication terminal WB, the device ID of the wireless communication terminal WA of the communications partner is stored. Then, it is set in the state in which wireless communications can be performed between the wireless communication terminal WB and the wireless communication terminal WA (step 103), and wireless communications can be started (end of authentication).

As mentioned above, two wireless communication terminals which communicate with each other can be associated in this embodiment, without being influenced by the position where each wireless communication terminal is installed.

By the way, since there is a possibility that communication contents may be monitored by other wireless communication terminals when performing wireless communications, it is preferred to perform encryption communications (encryption wireless communications) in which the encrypted information is transferred.

It is necessary to carry out exchanging of the information (encryption key or decryption key) needed for encryption of communication contents in advance of starting encryption communication, and a memory card MC can be used for the exchanging of such encryption key.

The known common cipher method in which an encryption key used for the encryption processing to convert a plaintext into a cipher is the same as a decryption key used for the decryption processing to convert the cipher into the original plaintext may be used as a suitable encryption method in this case.

That is, the wireless communication terminal WB (host) writes the host ID (CHID), set in the terminal device concerned, to the memory card MC.

Subsequently, the user takes out the memory card MC to which the host ID is written, from the external memory interface unit 34 of the wireless communication terminal WB, carries it to the wireless communication terminal WA, and mounts it to the external memory interface unit 7 of the wireless communication terminal WA.

In the wireless communication terminal WA, the host ID is read from the memory card MC mounted to the external memory interface unit 7, and the same is stored into the nonvolatile memory unit 9.

Subsequently, the wireless communication terminal WA writes the device ID (CDID), set in the terminal device concerned, to the memory card MC.

Subsequently, the user takes out the memory card MC to which the device ID is additionally written, from the external memory interface unit 7 of the wireless communication terminal WA, carries it to the wireless communication terminal WB, and mounts it to the external memory interface unit 34 of the wireless communication terminal WB.

In the wireless communication terminal WB, the device ID is read from the memory card MC mounted to the external memory interface unit 34, and the same is stored into the magnetic disc device 28.

Figure 5B:
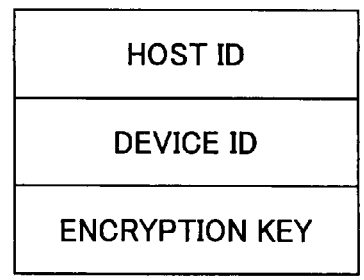

Subsequently, the wireless communication terminal WB creates an encryption key (decryption key) used for encryption wireless communications, and stores it into the memory card MC. Therefore, at this time, as shown in FIG. 5B, a host ID, a device ID, and an encryption key are written to the memory card MC.

Subsequently, the user takes out the memory card MC to which the host ID is written, from the external memory interface unit 34 of the wireless communication terminal WB, carries it to the wireless communication terminal WA, and mounts it to the external memory interface unit 7 of the wireless communication terminal WA.

In the wireless communication terminal WA, the encryption key is read from the memory card MC mounted to the external memory interface unit 7, and the same is stored in nonvolatile memory unit 9. The exchanging of the host ID and the device ID and the notification of the encryption key are carried out using the memory card MC as mentioned above.

Figure 7:
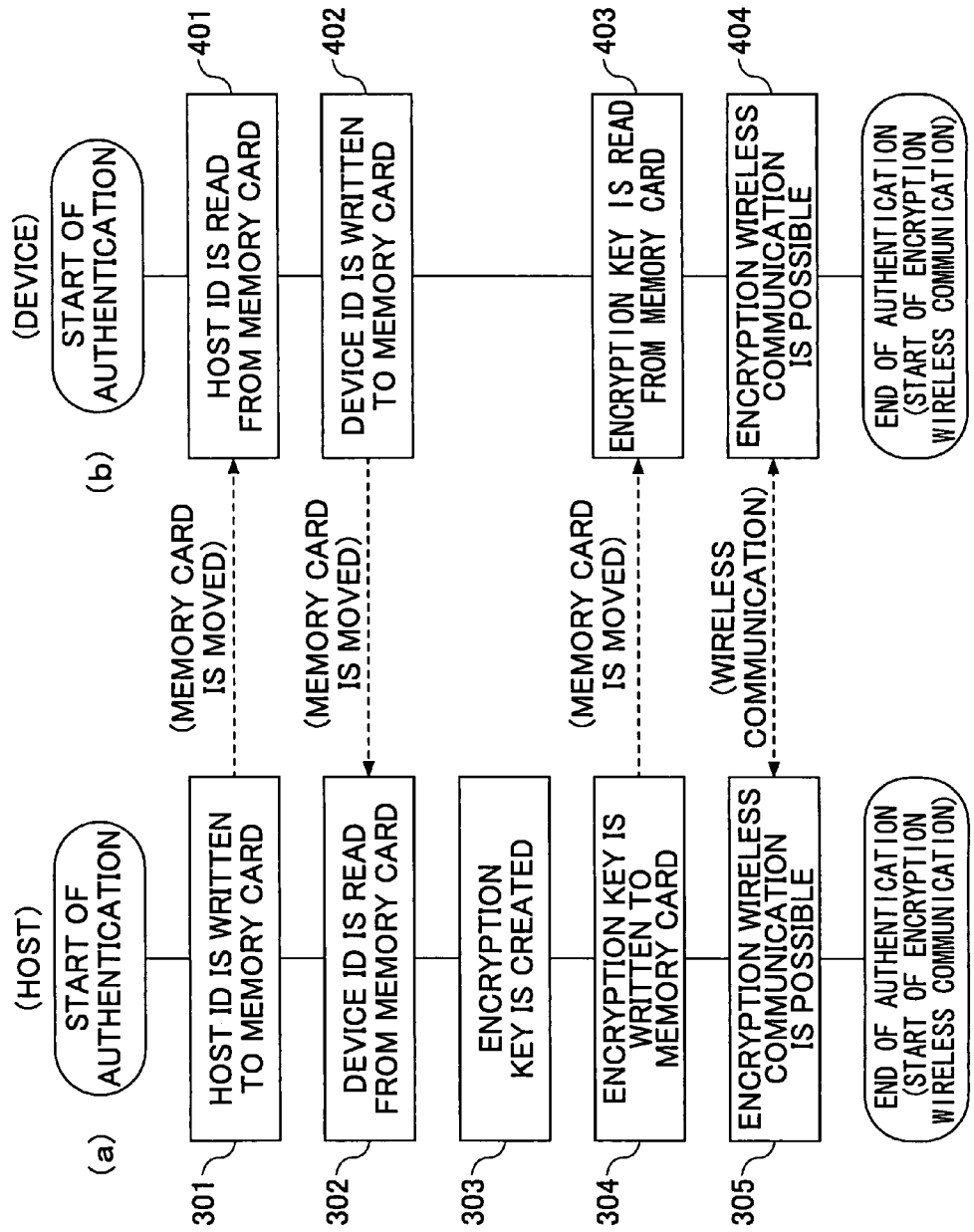
FIG. 7 is a flowchart for explaining another example of the processing performed by the host and the device.

FIGS. 7 (*a*) and (*b*) shows an example of the processing performed by the host (wireless communication terminal WB) and the device (wireless communication terminal WA, WC). The processing is equivalent to authentication operation for recognizing the terminal device of the communications partner in advance of execution of wireless communications.

First, the wireless communication terminal WB (host) writes the host ID (CHID), set in the terminal device concerned, to the memory card MC (step 301). Since operation of wireless communication terminal WB of this step is the same as that of step 101 shown in FIG. 6 (*a*), a description thereof will be omitted.

Subsequently, the user takes out the memory card MC to which the host ID is written, from the external memory interface unit 34 of the wireless communication terminal WB, carries it to the wireless communication terminal WA (device), and mounts it to the external memory interface unit 7 of the wireless communication terminal WA.

In the wireless communication terminal WA, the host ID is read from memory card MC with which external memory interface unit 7 was equipped, and the same is stored in nonvolatile memory unit 9 (step 401). Since operation of the wireless communication terminal WA of this step is the same as that of step 201 in FIG. 6 (*b*), a description thereof will be omitted.

Subsequently, the wireless communication terminal WA writes the device ID (CDID), set in the terminal device concerned, to the memory card MC (step 402). Since operation of wireless communication terminal WA of this step is the same as that of step 202 shown in FIG. 6 (*b*), a description thereof will be omitted.

Subsequently, the user takes out the memory card MC to which the device ID is additionally written, from the external memory interface unit 7 of the wireless communication terminal WA, carries it to the wireless communication terminal WB, and mounts it to the external memory interface unit 34 of the wireless communication terminal WB.

In the wireless communication terminal WB, the device ID is read from the memory card MC mounted to the external memory interface unit 34, and the same is stored into the magnetic disc device 28 (step 302). Since operation of the wireless communication terminal WB of this step is the same as that of step 102 in FIG. 6 (*a*), a description thereof will be omitted.

Next, in the wireless communication terminal WB, an encryption key (decryption key) used for encryption wireless communications is created (step 303), and it is written to the memory card MC (step 304).

Subsequently, the user takes out the memory card MC to which the encryption key is additionally written, from the external memory interface unit 34 of the wireless communication terminal WB, carries it to the wireless communication terminal WA (device), and mounts it to the external memory interface unit 7 of the wireless communication terminal WA.

In the wireless communication terminal WA, the encryption key (decryption key) is read from the memory card MC mounted to the external memory interface unit 7, and the same is stored into the nonvolatile memory unit 9 (step 403).

Thus, in the wireless communication terminal WA, the host ID of the wireless communication terminal WB of the communications partner and the encryption key (decryption key) used for encryption wireless communications are stored. In the wireless communication terminal WB, the device ID of the wireless communication terminal WA of the communications partner and the encryption key used for encryption wireless communications are stored. It is in the state in which encryption wireless communication can be performed between the wireless communication terminal WB and the wireless communication terminal WA (steps 305 and 404), and encryption wireless communications can be started (end of authentication).

As mentioned above, two wireless communication terminals which communicate with each other can be associated in this embodiment, without being influenced by the position where each wireless communication terminal is installed. It is possible to exchange the encryption key needed for performing encryption wireless communications.

Figure 5C:
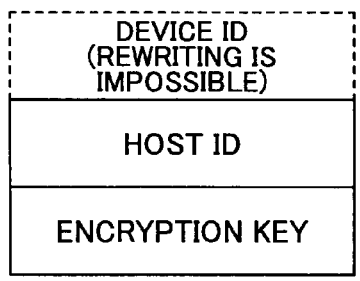

By the way, the device ID used by the device side can be decided at the time of manufacture of the terminal device, it is a manufacturing stage of memory card MC, and as shown in FIG. 5C, it can write in the state (for example, ROM area etc.) where a device ID is not rewritable, and such a memory card MC can be used, for example.

Figure 8:
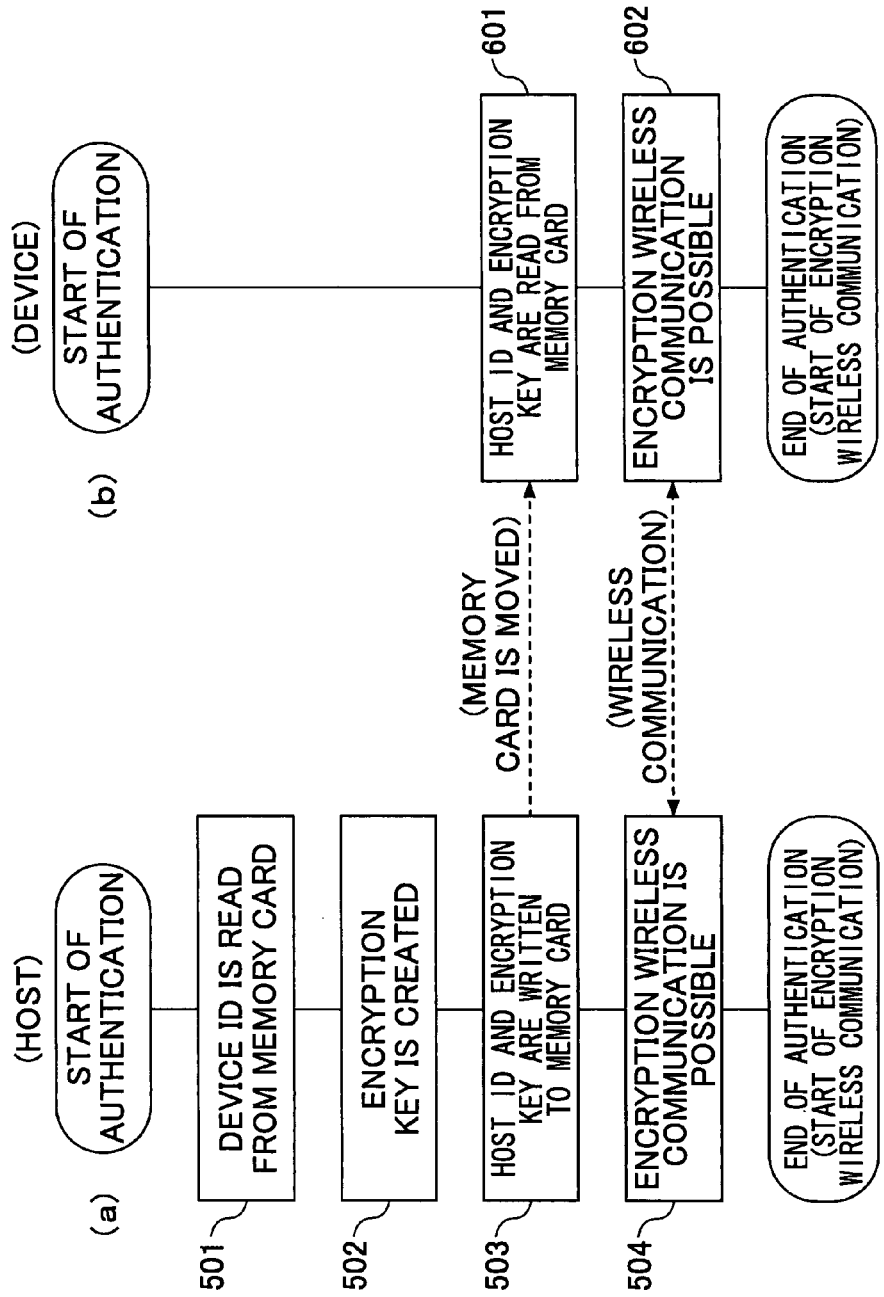
FIG. 8 is a flowchart for explaining another example of the processing performed by the host and the device.

FIGS. 8 (*a*) and (*b*) shows an example of the processing performed by the host (wireless communication terminal WB) and the device (wireless communication terminal WA, WC). The processing is equivalent to authentication operation for recognizing the communications partner for each terminal device in advance of execution of wireless communications.

First, the user mounts the memory card to which the device ID of the wireless communication terminal WA (device) is written to the external memory interface unit 34 of the wireless communication terminal WB (host).

Subsequently, in the wireless communication terminal WB, the device ID is read from memory card MC mounted to the external memory interface unit 34, and the same is stored into the magnetic disc device 28 (step 501). Since operation of the wireless communication terminal WB of this step is the same as that of step 102 shown in FIG. 6 (*a*), a description thereof will be omitted.

Next, in the wireless communication terminal WB, an encryption key (decryption key) used for encryption wireless communications is created (step 502), and the host ID (CHID) set in the terminal device concerned and the encryption key are written to the memory card MC (step 503).

Subsequently, the user takes out the memory card MC to which the host ID and the encryption key are written, from the external memory interface unit 34 of the wireless communication terminal WB, carries it to the wireless communication terminal WA, and mounts it to the external memory interface unit 7 of the wireless communication terminal WA.

In the wireless communication terminal WA, the host ID and the encryption key (decryption key) are read from the memory card MC mounted to the external memory interface unit 7, and the same is stored into the nonvolatile memory unit 9 (step 601). Since operation of the wireless communication terminal WA of this step is similar to that of step 201 in FIG. 6(*b*), a description thereof will be omitted.

Thus, the host ID of the wireless communication terminal WB of the communications partner and the encryption key (decryption key) used for encryption wireless communications are stored in the wireless communication terminal WA. The device ID of the wireless communication terminal WA of the communications partner and the encryption key used for encryption wireless communications are stored in the wireless communication terminal WB. It is in the state in which encryption wireless communication can be performed between the wireless communication terminal WB and the wireless communication terminal WA (steps 504 and 602), and encryption wireless communications can be started (end of authentication).

As mentioned above, two wireless communication terminals which communicate with each other can be associated in this embodiment, without being influenced by the position where each wireless communication terminal is installed. It is possible to exchange the encryption key needed for performing the encryption wireless communications.

By using the memory card MC to which the device ID is written beforehand, the number of times of movement of the memory card MC can be reduced and convenience for the user can be improved.

Figure 5D:
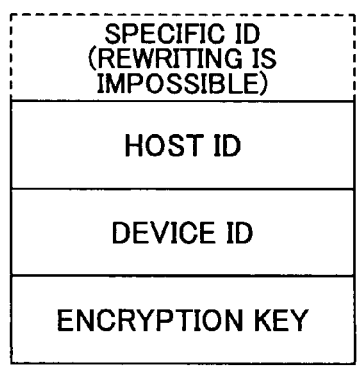

By the way, in a certain memory card MC, a specific ID for identifying that memory card is recorded in the un-rewritable area (or ROM area) in a nonvolatile manner, and such a memory card MC may be used in this embodiment. Examples of such a memory card MC may include SD card (registered trademark), Smart Media with ID (registered trademark), Memory Stick (registered trademark), xD-Picture Card (registered trademark), Secure Multimedia Card (registered trademark), etc. (see FIG. 5D).

Figure 9:
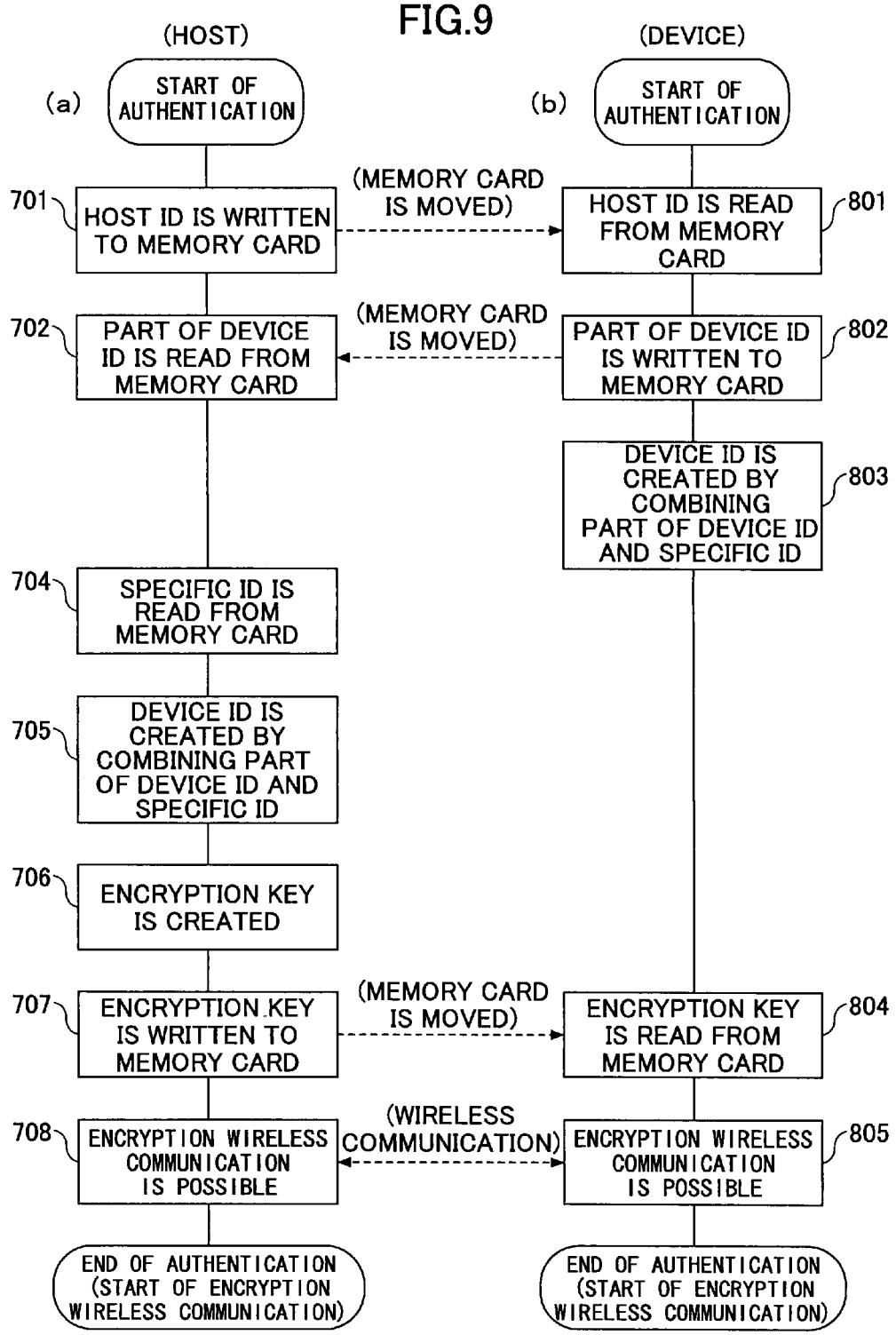
FIG. 9 is a flowchart for explaining another example of the processing performed by the host and the device.

FIGS. 9 (*a*) and (*b*) shows an example of the processing performed by the host (wireless communication terminal WB) and the device (wireless communication terminal WA, WC) when the above-mentioned memory card MC is used. The processing is equivalent to authentication operation for recognizing a communications partner for each terminal device in advance of execution of wireless communications.

First, the wireless communication terminal WB (host) writes the host ID (CHID) set in the terminal device concerned to the memory card MC (step 701). Since operation of wireless communication terminal WB in this step is the same as that of step 101 shown in FIG. 6 (*a*), a description thereof will be omitted.

Subsequently, the user takes out the memory card MC to which the host ID was written from the external memory interface unit 34 of the wireless communication terminal WB, carries it to the wireless communication terminal WA (device), and mounts it to the external memory interface unit 7 of the wireless communication terminal WA.

In the wireless communication terminal WA, host ID and specific ID of memory card MC are read from memory card MC with which external memory interface unit 7 was equipped, and the same is stored in nonvolatile memory unit 9 (step 801). Since operation of the wireless communication terminal WA of this step is similar to that of step 201 in FIG. 6(*b*), a description thereof will be omitted.

Subsequently, the wireless communication terminal WA writes a part of the device ID (CDID) set in the terminal device concerned to the memory card MC (step 802).

Subsequently, the user takes out the memory card MC to which a part of the device ID is additionally written, from the external memory interface unit 7 of the wireless communication terminal WA, carries it to the wireless communication terminal WB, and mounts it to the external memory interface unit 34 of wireless communication terminal WB.

The memory card MC with which external memory interface unit 34 was equipped in wireless communication terminal WB to a part of device ID, a specific ID of memory card MC is read (steps 702 and 704), the part and specific ID of a device ID are united, and a device ID is set up (step 705).

Next, in the wireless communication terminal WB, an encryption key (decryption key) used for encryption wireless communications is created (step 706), and it is written to the memory card MC (step 707).

Subsequently, the user takes out the memory card MC to which the encryption key is additionally written, from the external memory interface unit 34 of the wireless communication terminal WB, carries it to the wireless communication terminal WA (device), and mounts it to the external memory interface unit 7 of the wireless communication terminal WA.

In the wireless communication terminal WA, the encryption key (decryption key) is read from the memory card MC mounted to the external memory interface unit 7, and the same is stored into the nonvolatile memory unit 9 (step 804).

Thus, in the wireless communication terminal WA, the encryption key (decryption key) used for host ID and encryption wireless communications of wireless communication terminal WB of the communications partner is stored. Since the encryption key used for the device ID and encryption wireless communications of wireless communication terminal WA of the communications partner is stored in the wireless communication terminal WB, it will be in the state in which encryption wireless communication can be performed between wireless communication terminal WB and wireless communication terminal WA after it (steps 708 and 805), and encryption wireless communications can be started (end of authentication).

Figure 5E:
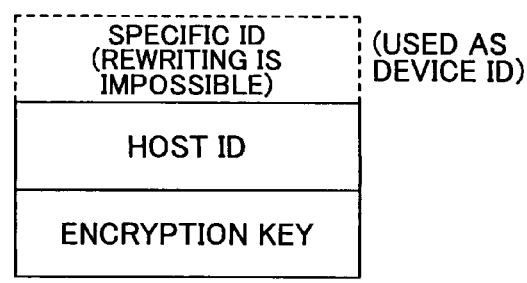

By the way, although the device ID used for the wireless communications (encryption wireless communications) then performed is set up in the embodiment mentioned above using a part of specific ID of memory card MC and device ID of a device, a specific ID of memory card MC can also be used as a device ID as it is (refer to FIG. 5E).

Figure 10:
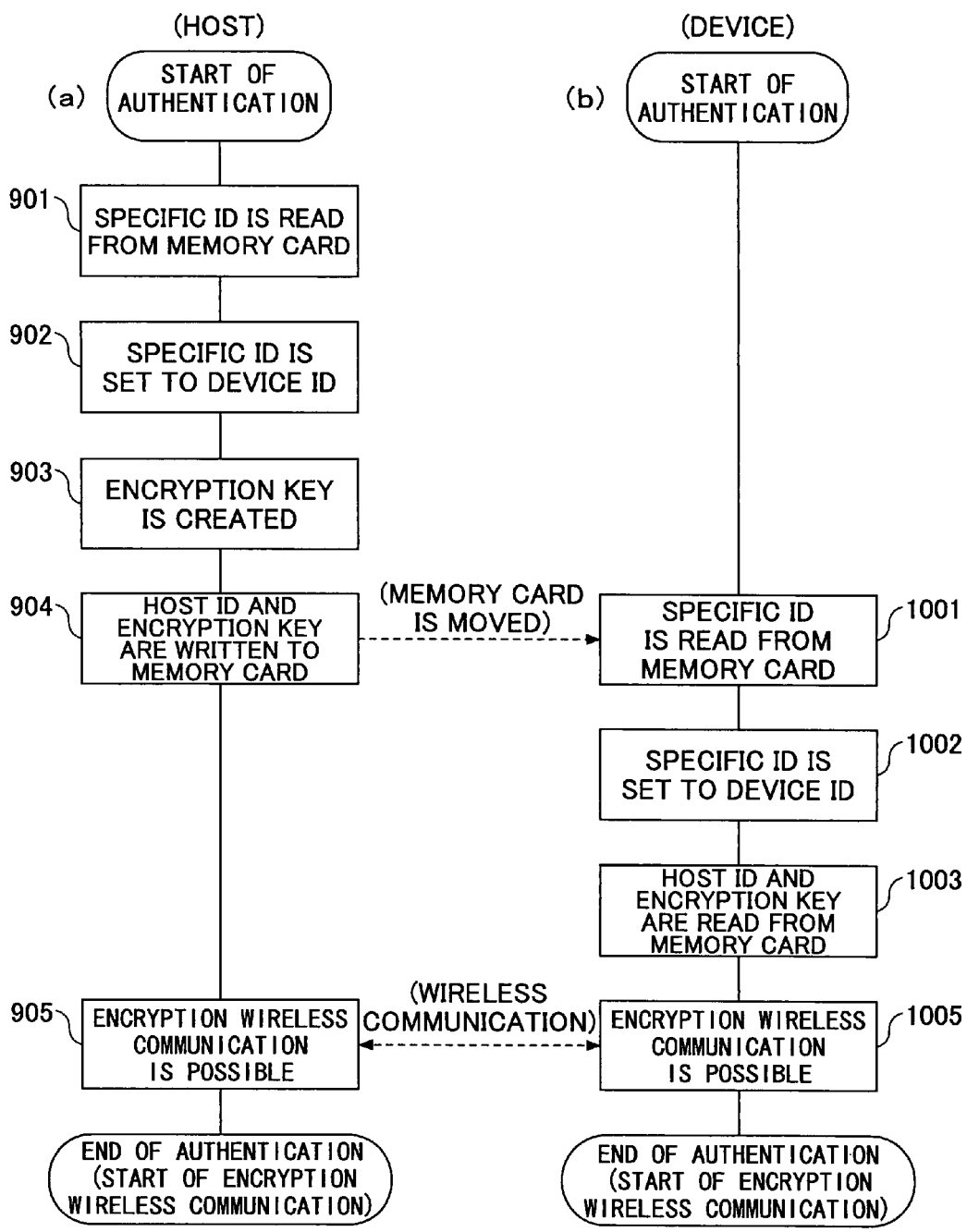
FIG. 10 is a flowchart for explaining another example of the processing performed by the host and the device.

FIGS. 10 (*a*) and (*b*) shows an example of the processing performed by the host (wireless communication terminal WB) and the device (wireless communication terminal WA, WC). The processing is equivalent to authentication operation for recognizing a communications partner for each terminal device in advance of execution of wireless communications.

First, in the wireless communication terminal WB (host), specific ID is read from memory card MC with which external memory interface unit 34 was equipped (step 901), and read specific ID is set as a device ID (step 902).

Next, in the wireless communication terminal WB, an encryption key (decryption key) used for encryption wireless communications is created (step 903), and the host ID (CHID) set in the terminal device concerned and the encryption key are written to the memory card MC (step 904).

Subsequently, the user takes out the memory card MC to which the host ID and the encryption key are written, from the external memory interface unit 34 of the wireless communication terminal WB, carries it to the wireless communication terminal WA, and mounts it to the external memory interface unit 7 of the wireless communication terminal WA.

In the wireless communication terminal WA, specific ID is read from memory card MC with which external memory interface unit 7 was equipped (step 1001), and read specific ID is set as a device ID (step 1002).

The host ID and the encryption key (decryption key) are read from memory card MC, and the same is stored in the nonvolatile memory unit 9 (step 1003). Thus, in the wireless communication terminal WA, the host ID of the wireless communication terminal WB of the communications partner and the encryption key (decryption key) used for encryption wireless communications are stored. The device ID of the wireless communication terminal WA of the communications partner and the encryption key used for encryption wireless communications are stored in the wireless communication terminal WB. It is in the state in which encryption wireless communication can be performed between the wireless communication terminal WB and the wireless communication terminal WA (steps 905 and 1005), and encryption wireless communications can be started (end of authentication).

By the way, a valid memory card MC that can be used can be restricted on the side of the device (wireless communication terminal WA, WC). In this case, a memory card MC in which its specific ID is stored is used and a set of registration specific IDs are beforehand registered in the device.

Figure 11:
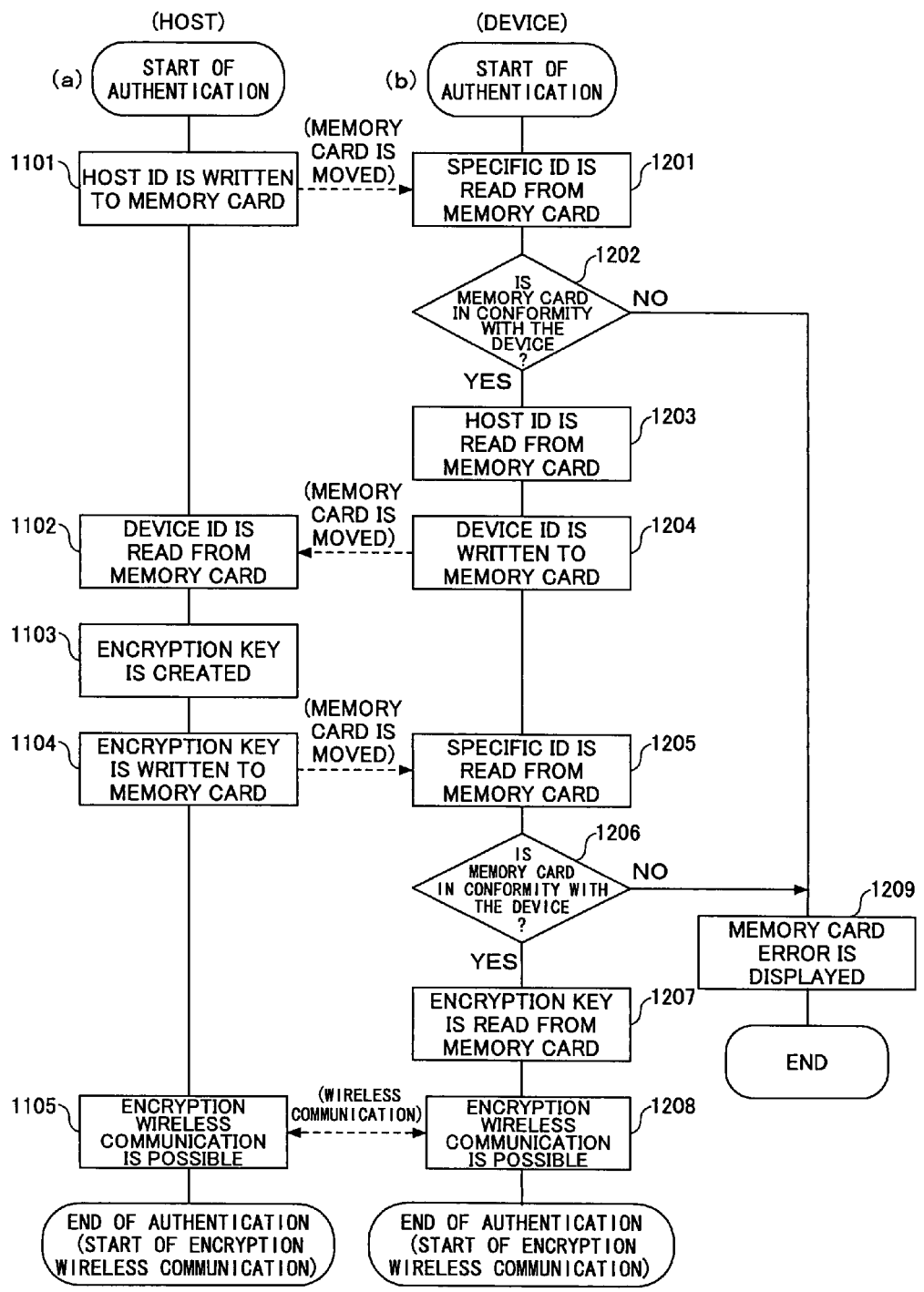
FIG. 11 is a flowchart for explaining another example of the processing performed by the host and the device.

FIGS. 11 (*a*) and (*b*) shows an example of the processing performed by the host (wireless communication terminal WB) and the device (wireless communication terminal WA, WC). The processing is equivalent to authentication operation for recognizing a communications partner for each terminal device in advance of execution of wireless communications.

First, the wireless communication terminal WB (host) writes the host ID (CHID) set in the terminal device concerned to the memory card MC (step 1101). Since operation of the wireless communication terminal WB of this step is the same as that of step 101 shown in FIG. 6 (*a*), a description thereof will be omitted.

Subsequently, the user takes out the memory card MC to which the host ID is written, from the external memory interface unit 34 of the wireless communication terminal WB, carries it to the wireless communication terminal WA (device), and mounts it to the external memory interface unit 7 of the wireless communication terminal WA.

In the wireless communication terminal WA, the specific ID is read from the memory card MC mounted to the external memory interface unit 7 (step 1201), and it is determined whether the read specific ID is in conformity with the specific ID registered in the terminal device concerned (step 1202).

When the result of determination of step 1202 is affirmative, host ID is read and the same is stored in nonvolatile memory unit 9 (step 1203).

Subsequently, the wireless communication terminal WA writes the device ID (CDID) set in the terminal device concerned to the memory card MC (step 1204). Since operation of the wireless communication terminal WA of this step is the same as that of step 202 shown in FIG. 6 (b), a description thereof will be omitted.

Subsequently, the user takes out the memory card MC to which the device ID is additionally written, from the external memory interface unit 7 of the wireless communication terminal WA, carries it to the wireless communication terminal WB, and mounts it to the external memory interface unit 34 of the wireless communication terminal WB.

In the wireless communication terminal WB, the device ID is read from the memory card MC mounted to the external memory interface unit 34, and the same is stored into the magnetic disc device 28 (step 1102). Since operation of the wireless communication terminal WB of this step is the same as that of step 102 shown in FIG. 6 (a), a description thereof will be omitted.

Next, in the wireless communication terminal WB, an encryption key (decryption key) used for encryption wireless communications is created (step 1103), and it is written to the memory card MC (step 1104).

Subsequently, the user takes out memory card MC to which the encryption key is additionally written, from the external memory interface unit 34 of the wireless communication terminal WB, carries it to the wireless communication terminal WA (device), and mounts it to the external memory interface unit 7 of the wireless communication terminal WA.

In the wireless communication terminal WA, the specific ID is read from the memory card MC mounted to the external memory interface unit 7 (step 1205), and it is determined whether the read specific ID is in conformity with the specific ID currently registered in the terminal device WA (step 1206).

When the result of determination of step 1206 is affirmative, the encryption key is read from the memory card MC, and the same is stored into the nonvolatile memory unit 9 (step 1207).

Thus, in the wireless communication terminal WA, the host ID of the wireless communication terminal WB of the communications partner and the encryption key (decryption key) used for encryption wireless communications are stored. And, in the wireless communication terminal WB, the device ID of the wireless communication terminal WA of the communications partner and the encryption key used for encryption wireless communications are stored.

Subsequently, it is set up in the state in which encryption wireless communication can be performed between the wireless communication terminal WB and the wireless communication terminal WA (steps 1105 and 1208), so that encryption wireless communications can be started (end of authentication).

In the case where it is determined that the specific ID read from memory card MC mounted to the wireless communication terminal WA is not in conformity with the registered specific ID, when the result of determination of step 1202 is negative, or when the result of determination of step 1206 is negative, a memory card error is displayed on the printer display unit 3 (step 1209). At this time, the operation of encryption wireless communications is not performed.

Figure 12:
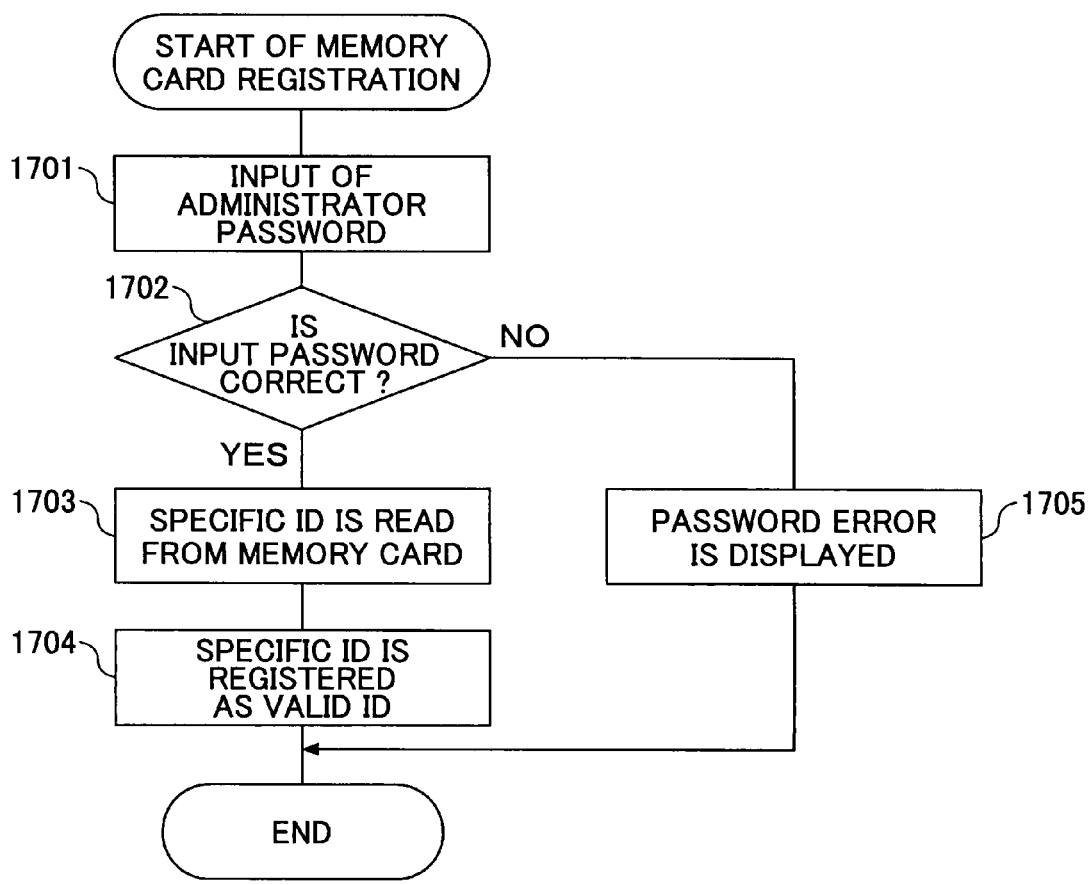
FIG. 12 is a flowchart for explaining an example of memory card registration processing.

FIG. 12 shows an example of the processing performed by the wireless communication terminals WA and WC when a specific ID of memory card MC to be used is registered. In this case, an administrator user is registered beforehand, and only the administrator user is allowed to perform this registering operation.

When memory card registration is requested, the input of an administrator password is requested and the administrator user is made to enter an administrator password (step 1701).

The administrator password registered beforehand is compared with the entered administrator password (step 1702).

When the administrator password is in agreement, the specific ID is read from the memory card MC mounted to the terminal device concerned (step 1703), and the read specific ID is registered as identification information which can be used (step 1704).

In the case where an administrator password error occurs, when the result of determination of step 1702 is negative, a password error is displayed on the printer display unit 3 (step 1705), and registration processing is not performed.

When the specific ID of the invalid memory card is registered and the mounted memory card MC is registered as a specific ID of the invalid memory card, the control may be carried out not to perform subsequent processing.

Figure 13:
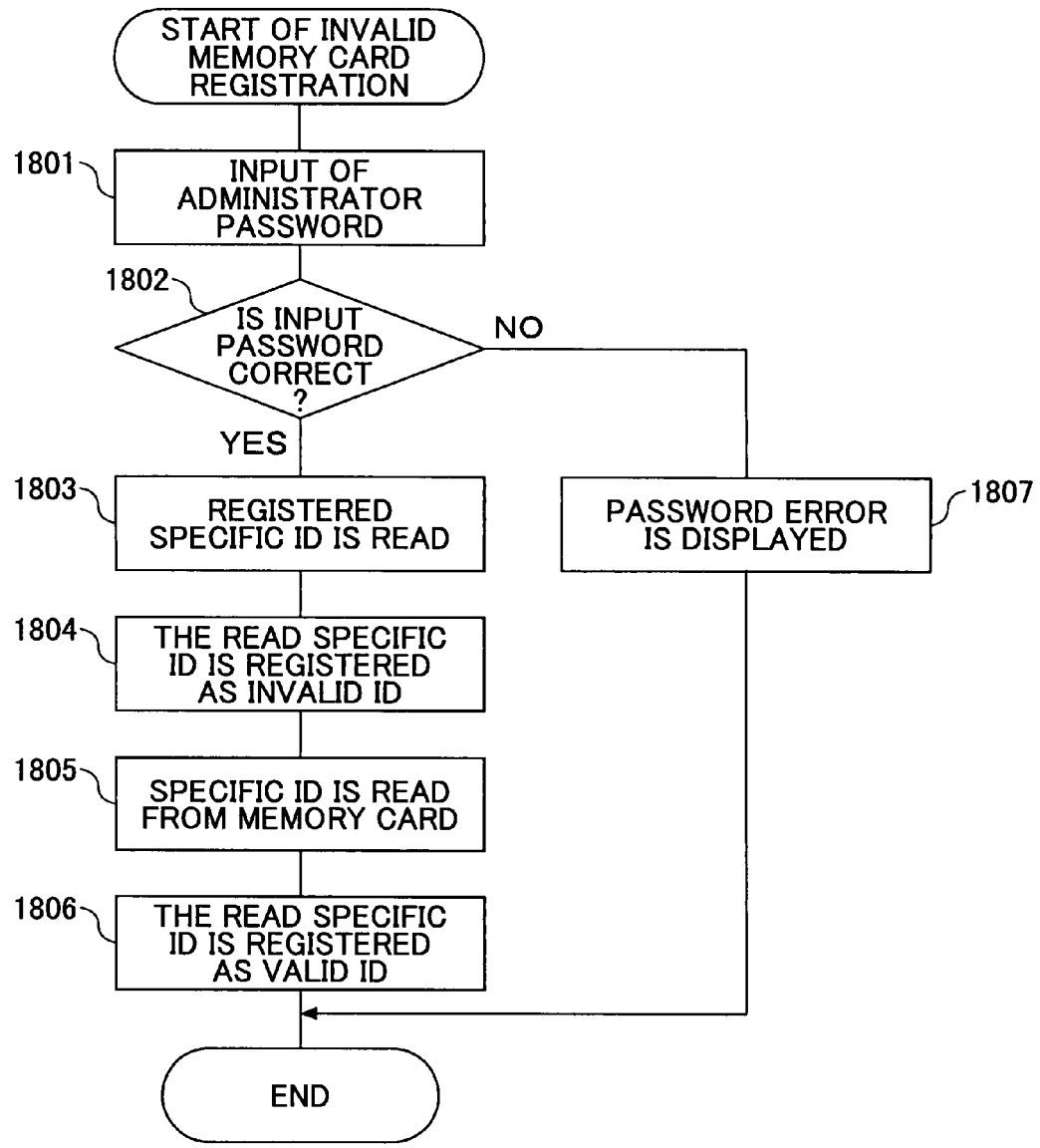
FIG. 13 is a flowchart for explaining an example of invalid memory card registration processing.

In that case, the processing shown in FIG. 13 is performed, and the specific ID of the invalid memory card is registered.

When invalid memory card registration is requested, the input of an administrator password is requested and the administrator user is made to enter an administrator password (step 1801). The administrator password registered beforehand is compared with the entered administrator password (step 1802).

When the administrator password is in agreement, the specific ID registered as a specific ID of memory card MC to be used (step 1803), and was read at step 1803, is registered as an invalid ID (specific ID of the invalid memory card) (step 1804).

Subsequently, the specific ID is read from the memory card MC currently mounted (step 1805), and the read specific ID is registered as a specific ID of a valid memory card (step 1806).

In the case where an administrator password error occurs, when the result of determination of step 1802 is negative, a password error is displayed on the printer display unit 3 (step 1807), and registration processing is not performed.

In the above manner, an invalid memory card is registered beforehand, for example, in the case where the memory card MC registered as the valid memory card is lost. Thus, it is possible to avoid the situation where the lost memory card is used illegally.

By the way, when performing encryption wireless communications, it is preferred to erase the encryption key from the memory card MC.

Figure 14:
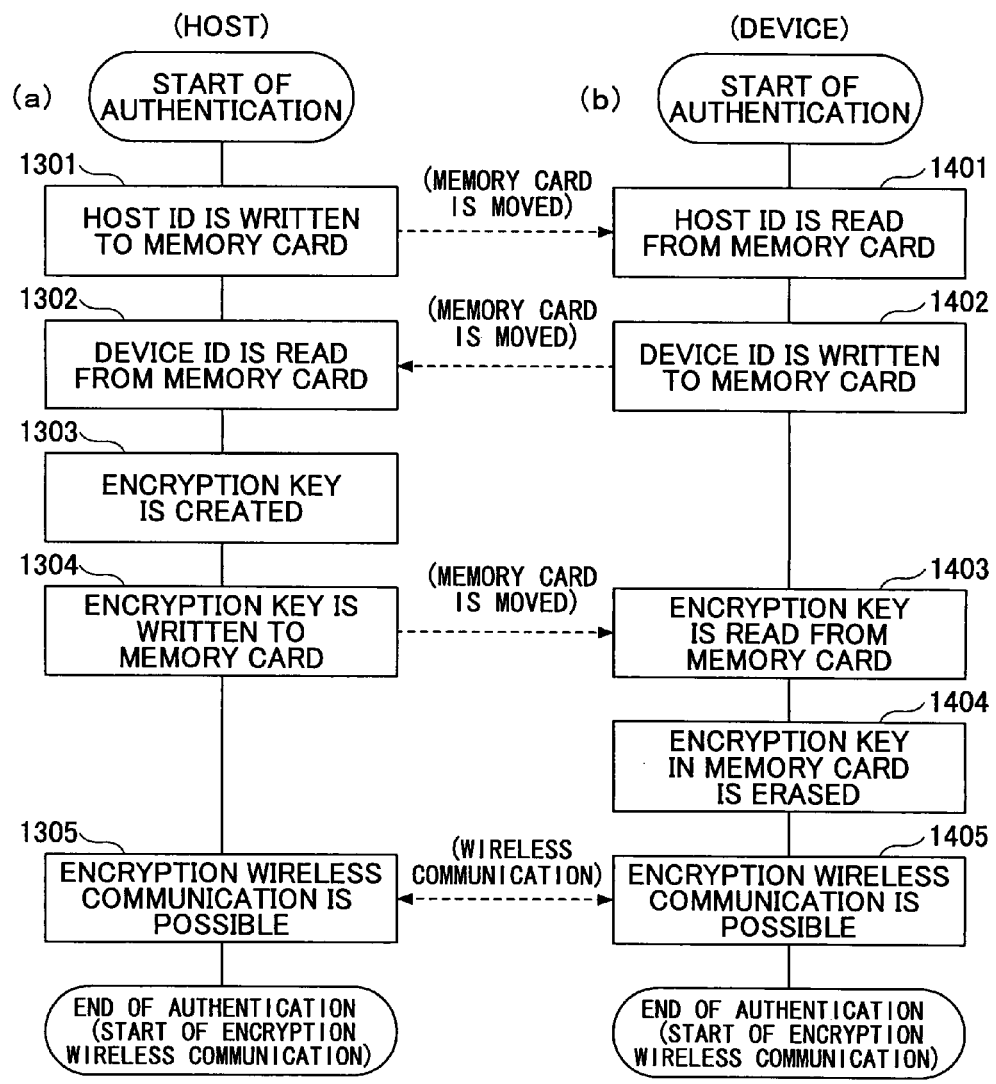
FIG. 14 is a flowchart for explaining another example of the processing performed by the host and the device.

FIGS. 14 (a) and (b) show an example of the processing performed by the host (wireless communication terminal WB) and the device (wireless communication terminal WA, WC) in this case. The processing is equivalent to authentication operation for recognizing a communications partner in advance of execution of wireless communications.

First, the wireless communication terminal WB (host) writes the host ID (CHID), which is set up in the terminal device concerned, to the memory card MC (step 1301). Since operation of the wireless communication terminal WB of this step is the same as that of step 101 in FIG. 6 (a), a description thereof will be omitted.

Subsequently, the user takes out the memory card MC to which the host ID is written from the external memory interface unit 34 of the wireless communication terminal WB, carries it to the wireless communication terminal WA (device), and mounts it to the external memory interface unit 7 of the wireless communication terminal WA.

In the wireless communication terminal WA, the host ID is read from the memory card MC mounted to the external memory interface unit 7, and it is stored into the nonvolatile memory unit 9 (step 1401). Since operation of the wireless communication terminal WA of this step is the same as that of step 201 shown in FIG. 6 (*b*), a description thereof will be omitted.

Subsequently, the wireless communication terminal WA writes the device ID (CDID), which is set up in the terminal device concerned, to the memory card MC (step 1402). Since operation of the wireless communication terminal WA of this step is the same as that of step 202 in FIG. 6 (*b*), a description thereof will be omitted.

Subsequently, the user takes out the memory card MC to which the device ID is additionally written, from the external memory interface unit 7 of the wireless communication terminal WA, carries it to the wireless communication terminal WB, and mounts it to the external memory interface unit 34 of the wireless communication terminal WB.

In the wireless communication terminal WB, the device ID is read from the memory card MC mounted to the external memory interface unit 34, and it is stored into the magnetic disc device 28 (step 1302). Since operation of the wireless communication terminal WB of this step is the same as that of step 102 in FIG. 6 (*a*), a description thereof will be omitted.

Next, in the wireless communication terminal WB, an encryption key (decryption key) used for encryption wireless communications is created (step 1303), and it is written to the memory card MC (step 1304).

Subsequently, the user takes out the memory card MC to which the encryption key is written, from the external memory interface unit 34 of the wireless communication terminal WB, carries it to the wireless communication terminal WA (device), and mounts it to the external memory interface unit 7 of the wireless communication terminal WA.

In the wireless communication terminal WA, the encryption key (decryption key) is read from the memory card MC mounted to the external memory interface unit 7, it is stored into the nonvolatile memory unit 9 (step 1403), and subsequently the encryption key is erased from the memory card MC (step 1404).

In this manner, in the wireless communication terminal WA, the encryption key (decryption key) used for encryption wireless communications and the host ID of the wireless communication terminal WB of the communications partner are stored, and, in the wireless communication terminal WB, the encryption key used for encryption wireless communications and the device ID of the wireless communication terminal WA of the communications partner are stored.

Subsequently, it is in the state in which encryption wireless communication can be performed between the wireless communication terminal WB and the wireless communication terminal WA (steps 1305 and 1405), and encryption wireless communications can be started (end of authentication).

In a case of a memory card MC of some type, the memory card is provided with a write-protect notch, and, using the write-protect notch, the memory card can be set in a write protect state.

Figure 15:
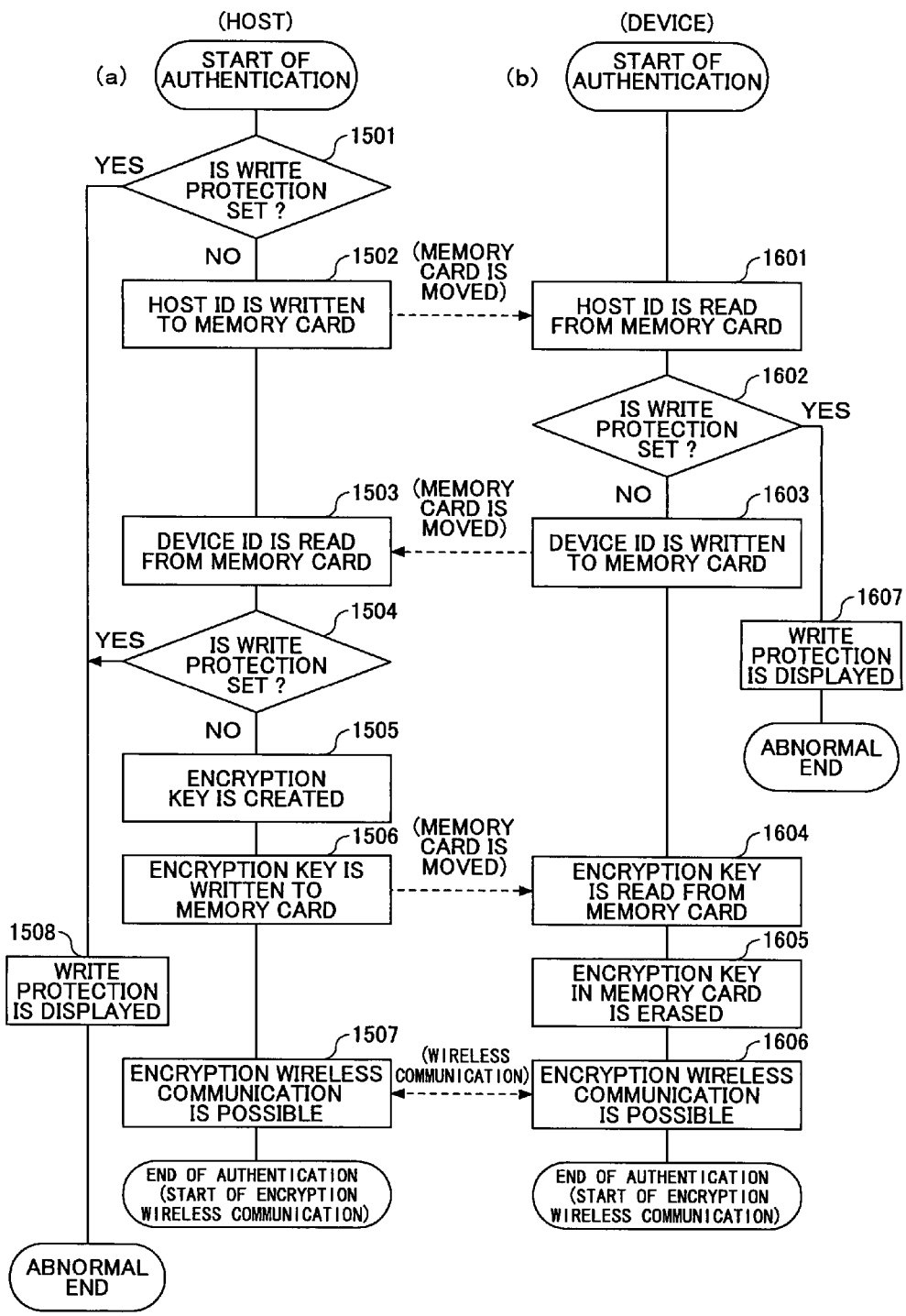
FIG. 15 is a flowchart for explaining another example of the processing performed by the host and the device.

FIGS. 15 (*a*) and (*b*) shows an example of the processing performed by the host (wireless communication terminal WB) and the device (wireless communication terminal WA, WC) in the case of using a memory card MC which can be set in a write protect state.

The processing is equivalent to authentication processing for recognizing a communications partner in advance of execution of wireless communications.

First, the wireless communication terminal WB (host) determines whether the mounted memory card MC is set in the write protect state (step 1501).

When the result of determination of step 1501 is negative, the host ID (CHID) set in the terminal device concerned is written to the memory card MC (step 1502). Since operation of the wireless communication terminal WB of this step is the same as that of step 101 in FIG. 6 (*a*), a description thereof will be omitted.

Subsequently, the user takes out the memory card MC to which the host ID is written, from the external memory interface unit 34 of the wireless communication terminal WB, carries it to the wireless communication terminal WA (device), and mounts it to the external memory interface unit 7 of the wireless communication terminal WA.

In the wireless communication terminal WA, the host ID is read from the memory card MC mounted to the external memory interface unit 7, and it is stored into the nonvolatile memory unit 9 (step 1601). Since operation of the wireless communication terminal WA of this step is the same as that of step 201 in FIG. 6 (*b*), a description thereof will be omitted.

Subsequently, it is determined whether the memory card MC mounted is set in the write protect state (step 1602).

When the result of determination of step 1602 is negative, the device ID (CDID) set in the terminal device concerned is written to the memory card MC (step 1603). Since operation of the wireless communication terminal WA of this step is the same as that of step 202 in FIG. 6(*b*), a description thereof will be omitted.

Subsequently, the user takes out the memory card MC to which the device ID is written, from the external memory interface unit 7 of the wireless communication terminal WA, carries it to the wireless communication terminal WB, and mounts it to the external memory interface unit 34 of the wireless communication terminal WB.

In the wireless communication terminal WB, the device ID is read from the memory card MC mounted to the external memory interface unit 34, and it is stored into the magnetic disc device 28 (step 1503). Since operation of the wireless communication terminal WB of this step is the same as that of step 102 in FIG. 6 (*a*), a description thereof will be omitted.

Next, it is determined whether the memory card MC mounted is set in the write protect state (step 1504).

When the result of determination of step 1504 is negative, an encryption key (decryption key) used for encryption wireless communications is created (step 1505), and it is written to the memory card MC (step 1506).

Subsequently, the user takes out the memory card MC to which the encryption key is additionally written, from the external memory interface unit 34 of the wireless communication terminal WB, carries it to the wireless communication terminal WA (device), and mounts it to the external memory interface unit 7 of the wireless communication terminal WA.

In the wireless communication terminal WA, the encryption key (decryption key) is read from the memory card MC mounted to the external memory interface unit 7, it is stored into the nonvolatile memory unit 9 (step 1604), and, subsequently the encryption key is erased from the memory card MC (step 1605).

Thus, in the wireless communication terminal WA, the encryption key (decryption key) used for encryption wireless communications and the host ID of the wireless communication terminal WB of the communications partner are stored, and in the wireless communication terminal WB, the encryption key used for encryption wireless communications and the device ID of the wireless communication terminal WA of the communications partner are stored.

Subsequently, it is set in the state in which encryption wireless communication can be performed between the wireless communication terminal WB and the wireless communication terminal WA (steps 1507 and 1606), and encryption wireless communications can be started (end of authentication).

On the other hand, in the case where it is checked that the memory card MC mounted to the wireless communication terminal WB is set in a write protect state, when the result of determination of step 1501 is affirmative, or when the result of determination of step 1504 is affirmative, a message indicating that it is in a write protect state is displayed (step 1508), and at the same time, operation is terminated so that the wireless communication is not performed.

Similarly, in the case where it is confirmed that the memory card MC mounted to the wireless communication terminal WA is set in a write protect state, when the result of determination of step 1602 is affirmative, a message indicating that it is in a write protect state is displayed (step 1607), and at the same time, operation is terminated so that the wireless communication is not performed.

In the above-mentioned embodiment, the case where the W-USB communication is used as wireless PAN has been described. However, the invention is applicable similarly even if it is a case where an equivalent wireless-communication system, such as wireless LAN, is used.

In the above-mentioned embodiment, the case where the invention is applied to the wireless PAN has been described. However, this invention is also applicable to a wired communication network system.

The present invention is not limited to the above-described embodiments, and variations and modifications may be made without departing from the scope of the present invention.

Further, the present application is based on and claims the benefit of priority of Japanese patent application No. 2006-165608, filed on Jun. 15, 2006, and Japanese patent application No. 2007-050671, filed on Feb. 28, 2007, the entire contents of which are hereby incorporated by reference.

What is claimed is:

1. A communication system in which a first terminal device and a second terminal device are connected via a wireless communication network and perform point-to-point communications with each other,
wherein each of the first and second terminal devices comprises an interface unit accessing a memory-card-type recording medium detachably mounted to the interface unit,
wherein information needed for one of the first and second terminal devices to communicate with the other terminal device is transferred between the first terminal device and the second terminal device using the recording medium,
wherein the first terminal device is configured to store, into the recording medium mounted to the first terminal device, first identification information for identifying the first terminal device and being notified to the second terminal device,
wherein the second terminal device is configured to read, when mounting of the recording medium to the second terminal device is detected after the recording medium is taken out from the first terminal device, the first identification information from the recording medium into the second terminal device, and is configured to store, into the recording medium mounted to the second terminal device, second identification information for identifying the second terminal device and being notified to the first terminal device, and
wherein the first terminal device is configured to read, when mounting of the recording medium to the first terminal device is detected after the recording medium is taken out from the second terminal device, the second identification information from the recording medium into the first terminal device.

2. The communication system according to claim 1, wherein the first terminal device is configured to create encryption-related information needed for performing encryption wireless communications, and is configured to store, into the recording medium mounted to the first terminal device, the encryption-related information and first identification information for identifying the first terminal device and being notified to the second terminal device, and
wherein the second terminal device is configured to read, when mounting of the recording medium to the second terminal device is detected after the recording medium is taken out from the first terminal device, the first identification information and the encryption-related information from the recording medium into the second terminal device.

3. The communication system according to claim 1, wherein a specific identification (ID) that is specific to the second terminal device is written beforehand to the recording medium in a non-volatile manner, and
wherein the first terminal device is configured to read the specific ID from the recording medium into the first terminal device as the second identification information for identifying the second terminal device and being notified to the first terminal device.

4. The communication system according to claim 3, wherein the first terminal device is configured to create encryption-related information needed for performing encryption wireless communications, is configured to store, into the recording medium mounted to the first terminal device, the first identification information and the encryption-related information that are notified to the second terminal device, and is configured to read the specific ID from the recording medium into the first terminal device as the second identification information being notified from the second terminal device, and
wherein the second terminal device is configured to read, when mounting of the recording medium to the second terminal device is detected after the recording medium is taken out from the first terminal device, the first identification information and the encryption-related information from the recording medium into the second terminal device.

5. The communication system according to claim 1, wherein a specific identification (ID) is written beforehand to the recording medium in a non-volatile manner,
wherein the first terminal device is configured to read the specific ID from the recording medium into the first terminal device as identification information for identifying the second terminal device and being notified to the first terminal device, and
wherein the second terminal device is configured to store the specific ID from the recording medium into the second terminal device as identification information for identifying the second terminal device and being notified to the first terminal device.

6. The communication system according to claim 5, wherein the first terminal device is configured to create encryption-related information needed for performing encryption wireless communications, and is configured to store, into the recording medium mounted to the first terminal device, the first identification information and the encryption-related information that are notified to the second terminal device, and wherein the second terminal device is configured to read, when mounting of the recording medium to the second terminal device is detected after the recording medium is taken out from the first terminal device, the first identification information and the encryption-related information from the recording medium into the second terminal device.

7. The communication system according to claim 5, wherein the second terminal device is configured to determine, when mounting of the recording medium to the second terminal device is detected after the recording medium in which the first identification information is stored is taken out from the first terminal device, whether the specific ID obtained from the recording medium is contained in registration specific IDs registered beforehand in the second terminal device,
wherein the second terminal device is configured to store, when the specific ID is contained in the registration specific IDs, the specific ID into the second terminal device as the identification information for identifying the second terminal device and being notified to the first terminal device, and simultaneously to read the first identification information from the recording medium into the second terminal device, and
wherein the second terminal device is configured to terminate the communications with the first terminal device when the specific ID is not contained in the registration specific IDs.

8. The communication system according to claim 6, wherein the second terminal device is configured to determine, when mounting of the recording medium to the second terminal device is detected after the recording medium in which the first identification information and the encryption-related information are stored is taken out from the first terminal device, whether the specific ID from the recording medium is contained in registration specific IDs registered beforehand in the second terminal device,
wherein the second terminal device is configured to store, when the specific ID is contained in the registration specific IDs, the specific ID into the second terminal device as identification information for identifying the second terminal device and being notified to the first terminal device, and simultaneously to read the first identification information and the encryption-related information from the recording medium into the second terminal device, and
wherein the second terminal device is configured to terminate the communications with the first terminal device when the specific ID is not contained in the registration specific IDs.

9. The communication system according to claim 7, wherein the second terminal device is configured to determine, when mounting of the recording medium to the second terminal device is detected after the recording medium in which the first identification information is stored is taken out from the first terminal device, whether the specific ID obtained from the recording medium is contained in invalid specific IDs registered beforehand in the second terminal device, and is configured to terminate the communications with the first terminal device when the specific ID is contained in the invalid specific IDs.

10. The communication system according to claim 8, wherein the second terminal device is configured to determine, when mounting of the recording medium to the second terminal device is detected after the recording medium in which the first identification information and the encryption-related information are stored is taken out from the first terminal device, whether the specific ID obtained from the recording medium is contained in invalid specific IDs registered beforehand in the second terminal device, and is configured to terminate the communications with the first terminal device when the specific ID is contained in the invalid specific IDs.

11. The communication system according to claim 1, wherein the first terminal device is configured to create encryption-related information needed for performing encryption wireless communications, and is configured to store, into the recording medium mounted to the first terminal device, the encryption-related information and first identification information for identifying the first terminal device and being notified to the second terminal device, and
wherein the second terminal device is configured to read, when mounting of the recording medium to the second terminal device is detected after the recording medium is taken out from the first terminal device, the first identification information and the encryption-related information from the recording medium into the second terminal device, and subsequently to erase the encryption-related information from the recording medium.

12. A terminal device for use in a communication system in which at least two terminal devices are connected via a wireless communication network and perform point-to-point communications with each other, the terminal device comprising:
an interface unit accessing a memory-card type recording medium detachably mounted to the interface unit;
wherein information needed for a first terminal device of the at least two terminal devices and a second terminal device of the at least two terminal devices to communicate with the first terminal device is transferred between the first terminal device and the second terminal device using the recording medium,
wherein the first terminal device is configured to store, into the recording medium mounted to the first terminal device, first identification information for identifying the first terminal device and being notified to the second terminal device,
wherein the second terminal device is configured to read, when mounting of the recording medium to the second terminal device is detected after the recording medium is taken out from the first terminal device, the first identification information from the recording medium into the second terminal device, and is configured to store, into the recording medium mounted to the second terminal device, second identification information for identifying the second terminal device and being notified to the first terminal device, and
wherein the first terminal device is configured to read, when mounting of the recording medium to the first terminal device is detected after the recording medium is taken out from the second terminal device, the second identification information from the recording medium into the first terminal device.

13. A method of controlling terminal devices in a communication system in which a first terminal device and a second terminal device are connected via a wireless communication network and perform point-to-point communications with each other, each of the first and second terminal devices comprising an interface unit accessing a memory-card-type recording medium that is detachably mounted to the interface unit, the method comprising:
causing the first terminal device to receive information, needed for the first terminal device to communicate with the second terminal device, from the second terminal device using the recording medium;

causing the second terminal device to receive information, needed for the second terminal device to communicate with the first terminal device, from the first terminal device using the recording medium;

causing the first terminal device to store, into the recording medium mounted to the first terminal device, first identification information for identifying the first terminal device and being notified to the second terminal device;

detecting mounting of the recording medium to the second terminal device after the recording medium is taken out from the first terminal device;

causing the second terminal device to read, when the mounting of the recording medium to the second terminal device is detected, the first identification information from the recording medium into the second terminal device, and to store, into the recording medium mounted to the second terminal device, second identification information for identifying the second terminal device and being notified to the first terminal device;

detecting mounting of the recording medium to the first terminal device after the recording medium is taken out from the second terminal device; and causing the first terminal device to read, when the mounting of the recording medium to the first terminal device is detected, the second identification information from the recording medium into the first terminal device.

14. The method according to claim 13, further comprising:
causing the first terminal device to create encryption-related information needed for performing encryption wireless communications;
causing the first terminal device to store, into the recording medium mounted to the first terminal device, the encryption-related information and the first identification information for identifying the first terminal device and being notified to the second terminal device; and
causing the second terminal device to read, when the mounting of the recording medium to the second terminal device is detected, the first identification information and the encryption-related information from the recording medium into the second terminal device.

15. The method according to claim 13, wherein a specific identification (ID) that is specific to the second terminal device is written beforehand to the memory-card-type recording medium in a non-volatile manner, the method further comprising:
causing the first terminal device to read the specific ID from the recording medium into the first terminal device as the second identification information for identifying the second terminal device and being notified to the first terminal device.

16. The method according to claim 13, wherein a specific identification (ID) is written beforehand to the memory-card-type recording medium in a non-volatile manner, the method further comprising:
causing the first terminal device to read the specific ID from the recording medium into the first terminal device as the second identification information for identifying the second terminal device and being notified to the first terminal device; and
causing the second terminal device to store the specific ID from the recording medium into the second terminal device as the second identification information for identifying the second terminal device and being notified to the first terminal device.

17. A non-transitory computer-readable medium having program code stored thereon which, when executed by a computer, causes the computer to perform a terminal device controlling method in a communication system in which a first terminal device and a second terminal device are connected via a wireless communication network and perform point-to-point communications with each other, each of the first and second terminal devices comprising an interface unit accessing a memory-card-type recording medium that is detachably mounted to the interface unit, wherein the method comprises:
causing the first terminal device to receive information, needed for the first terminal device to communicate with the second terminal device, from the second terminal device using the recording medium; and
causing the second terminal device to receive information, needed for the second terminal device to communicate with the first terminal device, from the first terminal device using the recording medium;
wherein the first terminal device is configured to store, into the recording medium mounted to the first terminal device, first identification information for identifying the first terminal device and being notified to the second terminal device,
wherein the second terminal device is configured to read, when mounting of the recording medium to the second terminal device is detected after the recording medium is taken out from the first terminal device, the first identification information from the recording medium into the second terminal device, and is configured to store, into the recording medium mounted to the second terminal device, second identification information for identifying the second terminal device and being notified to the first terminal device, and
wherein the first terminal device is configured to read, when mounting of the recording medium to the first terminal device is detected after the recording medium is taken out from the second terminal device, the second identification information from the recording medium into the first terminal device.

18. The non-transitory computer-readable medium according to claim 17, wherein the method further comprises:
causing the first terminal device to store, into the recording medium mounted to the first terminal device, the first identification information for identifying the first terminal device and being notified to the second terminal device;
detecting the mounting of the recording medium to the second terminal device after the recording medium is taken out from the first terminal device;
causing the second terminal device to read, when the mounting of the recording medium to the second terminal device is detected, the first identification information from the recording medium into the second terminal device, and to store, into the recording medium mounted to the second terminal device, the second identification information for identifying the second terminal device and being notified to the first terminal device;
detecting the mounting of the recording medium to the first terminal device after the recording medium is taken out from the second terminal device; and
causing the first terminal device to read, when the mounting of the recording medium to the first terminal device is detected, the second identification information from the recording medium into the first terminal device.

* * * * *